US007224098B2

(12) United States Patent
Matsuzawa et al.

(10) Patent No.: US 7,224,098 B2
(45) Date of Patent: May 29, 2007

(54) ULTRASONIC TRANSDUCER AND METHOD OF MANUFACTURING ULTRASONIC TRANSDUCER

(75) Inventors: Kinya Matsuzawa, Nagano (JP); Mutsuto Tezuka, Nagano (JP)

(73) Assignee: Seiko Epson Corporation (JP)

( * ) Notice: Subject to any disclaimer, the term of this patent is extended or adjusted under 35 U.S.C. 154(b) by 110 days.

(21) Appl. No.: 11/136,310

(22) Filed: May 24, 2005

(65) Prior Publication Data

US 2005/0269899 A1 Dec. 8, 2005

(30) Foreign Application Priority Data

Jun. 3, 2004 (JP) ............................ 2004-165784

(51) Int. Cl.
*H02N 1/00* (2006.01)

(52) U.S. Cl. ..................................................... 310/309

(58) Field of Classification Search ................. 310/309
See application file for complete search history.

(56) References Cited

U.S. PATENT DOCUMENTS 4,887,248 A * 12/1989 Griebeler .................... 367/181
6,265,806 B1 * 7/2001 Suzuki ....................... 310/309
2004/0066113 A1 * 4/2004 Kasahara et al. ........... 310/309
2004/0212275 A1 * 10/2004 Koga et al. ................. 310/309

FOREIGN PATENT DOCUMENTS

| | | |
|---|---|---|
| JP | 56-042493 | 4/1981 |
| JP | 58-046800 | 3/1983 |
| JP | 2000-050392 | 2/2000 |
| JP | 2003-18696 | 1/2003 |

OTHER PUBLICATIONS

Communication from Korean Patent Office regarding related application.

* cited by examiner

*Primary Examiner*—Thomas M. Dougherty
(74) *Attorney, Agent, or Firm*—Harness, Dickey & Pierce, P.L.C.

(57) ABSTRACT

The present invention relates to an ultrasonic transducer that has a diaphragm in which an electrode layer is formed thereon. A fixed electrode having a plurality of asperities on the surface facing the diaphragm is provided. An alternating current signal is applied between the electrode layer formed on the diaphragm and the fixed electrode to generate ultrasonic waves. A groove is formed on the upper surface of the projections of the asperities of the fixed electrode to prevent the diaphragm from sticking to the fixed electrode.

6 Claims, 11 Drawing Sheets

RESONANT ULTRASONIC TRANSDUCER

ULTRASONIC TRANSDUCER AND METHOD OF MANUFACTURING ULTRASONIC TRANSDUCER

RELATED APPLICATIONS

This application claims priority to Japanese Patent Application No. 2004-165784 filed Jun. 3, 2004 which is hereby expressly incorporated by reference herein in its entirety.

BACKGROUND

1. Technical Field

The present invention relates to an ultrasonic transducer and a method of manufacturing the ultrasonic transducer. In particular, it relates to an electrostatic ultrasonic transducer capable of increasing the efficiency of conversion between an electrical signal and a sound signal to increase an output sound pressure level and facilitating micromachining of a fixed electrode (a lower electrode) necessary therefor and a method of manufacturing the electrostatic ultrasonic transducer.

2. Related Art

Most related-art ultrasonic transducers are of a resonance type that use piezoelectric ceramics. A structural example of the related-art resonant ultrasonic transducers is shown in FIG. 10. The ultrasonic transducer shown in FIG. 10 performs both conversion from an electrical signal into an ultrasonic wave and conversion from an ultrasonic wave into an electrical signal (transmission and reception of an ultrasonic wave) using piezoelectric ceramics as a vibration element.

The bimorph ultrasonic transducer shown in FIG. 10 includes two piezoelectric ceramics 61 and 62, a cone 63, a case 64, leads 65 and 66, and a screen 67. The piezoelectric ceramics 61 and 62 are bonded together. The leads 65 and 66 are connected to the surfaces opposite to the bonded surfaces, respectively. The resonant ultrasonic transducer uses the resonance phenomenon of the piezoelectric ceramics, so that ultrasonic transmission- and reception-characteristics are in good condition in a relatively narrow frequency band around its resonant frequency.

Unlike the resonant ultrasonic transducer shown in FIG. 10, electrostatic ultrasonic transducers have been known as broad-band-oscillating ultrasonic transducers capable of generating high sound pressure across a high frequency band. A concrete example of the broad-band-oscillating ultrasonic transducers is shown in FIGS. 11A and 11B.

The electrostatic ultrasonic transducer shown in FIG. 11A uses a dielectric (an insulator) 131 of the order of 3 to 10 μm thick, made of polyethylene terephthalate resin, as a diaphragm or vibrator. To the dielectric 131, an upper electrode 132 made of metal foil such as aluminum is formed on the upper surface thereof by vapor deposition, and a fixed electrode (a lower electrode) 133 made of brass or the like is disposed below the lower surface of the dielectric 131. The dielectric 131 and the upper electrode 132 (Bank of the upper electrode 132) contact each other by applying a DC bias voltage, and the dielectric 131 vibrates by applying an AC voltage.

Random uneven microscopic asperities of the order of tens to several hundred μm are formed on the surface of the lower electrode 133 adjacent to the dielectric 131. The asperities form a space between the lower electrode 133 and the dielectric 131, so that the distribution of the capacitance between the upper electrode 132 and the lower electrode 133 varies slightly. The random microscopic asperities can be formed by roughening the surface of the lower electrode 133 manually. The electrostatic ultrasonic transducer has such asperities to form a large number of capacitors. Accordingly, the frequency response of an ultrasonic transducer 122 can be a broad band response as shown by curve Q1 in FIG. 11B. The asperities also offer the advantage of increasing the efficiency of conversion between an electrical signal and a sound signal (increasing the level of output sound pressure).

The characteristics of the electrostatic ultrasonic transducer are thus improved by the asperities on the fixed electrode. However, when the surfaces (the upper surfaces) of the projections of the asperities are flat, a strong electrostatic force is applied to the space between it and the diaphragm to make the diaphragm stick to the flat surfaces of the projections, so that the diaphragm is sometimes restrained by the projections and so hardly vibrates, decreasing the efficiency of conversion between a sound signal and an electrical signal.

Several inventions of an electrostatic ultrasonic transducer have been disclosed in which asperities (voids) are provided between the diaphragm and the fixed electrode (the lower electrode). For example, an invention in which voids are formed by a dielectric spacer is disclosed in JP-A-2000-50392 and an invention in which the fixed electrode is provided with communication holes connecting with the groove, thereby decreasing the resonant frequency and increasing the conversion efficiency between a sound signal and an electrical signal is disclosed in JP-A-58-46800.

However, the related arts have not been able to solve the problem of the diaphragm sticking to the flat surfaces of the projections so that the diaphragm is restrained by the projections and hardly vibrates.

SUMMARY

An advantage of the invention is to provide an electrostatic ultrasonic transducer that has asperities on the surface of a fixed electrode (lower electrode) to achieve broad band response and increase the efficiency of conversion between an electrical signal and a sound signal, thereby increasing the level of output sound pressure, in which the level of output sound pressure is further increased and the fixed electrode (lower electrode) therefor can easily be micromachined, and a method of manufacturing the electrostatic ultrasonic transducer.

According to a first aspect of the invention, there is provided an ultrasonic transducer including a diaphragm in which an electrode layer is formed on an insulator, and a fixed electrode having a plurality of asperities on the surface facing the diaphragm, wherein an alternating current signal is applied between the electrode layer formed on the diaphragm and the fixed electrode to generate ultrasonic waves, wherein a groove is formed on the upper surface of the projections of the asperities of the fixed electrode.

With such a structure, in the electrostatic ultrasonic. transducer, the surface of the fixed electrode (the lower electrode) facing the diaphragm having an upper electrode has an asperity structure and the surfaces of the projections of the fixed electrode (the lower electrode) have a groove (a continuous groove or recesses).

This structure prevents the diaphragm from being adsorbed by (sticking to) the fixed electrode (the lower electrode), thereby improving the efficiency of converting an electrical signal to a sound signal to increase the level of output sound pressure. Also the capacitance between the upper electrode and the fixed electrode (the lower electrode) can be reduced, thereby decreasing the drive current of the ultrasonic transducer.

It is preferable that the groove be formed by applying droplets onto the upper surface of the projections by an ink jet method to form banks.

With such a structure, a droplet material is applied onto the surfaces of the projections of the fixed electrode (the lower electrode) of the ultrasonic transducer by an ink jet method to form the banks of a minute height, thereby forming a groove (a continuous groove or recesses) on the surfaces of the projections.

Accordingly, the banks of a minute height and the groove can be formed extremely easily on the projections of the fixed electrode (the lower electrode). The ink jet method has high flexibility in the direction of application including rotation, so that the continuous groove or independent recesses can be easily formed on the circular projections. Since the groove or recesses of a minute depth generally needed to be formed by etching in the past, it required an etching mask and etchant, posing the problem of an increase in cost and environmental problem of waste disposal. However, by the ink jet method, material can be applied only to the required portion to be raised, and so it is advantageous in cost and environmental considerations.

In one embodiment the groove formed by the banks is in the form of a continuous groove.

With such a structure, the banks of a minute height are arranged in parallel on the projections of the fixed electrode (the lower electrode) to form a continuous groove.

Thus, a groove can easily be formed on the projections of the fixed electrode (the lower electrode), thereby improving the characteristics of the ultrasonic transducer. Particularly, the use of the ink jet method facilitates the banks of a minute height to be formed on the projections.

The groove formed by the banks can alternatively be in the form of independent recesses.

With such a structure, the banks of a minute height are first disposed in parallel on the projections of the fixed electrode (the lower electrode) to form a continuous groove, then banks serving as partitions are formed in the continuous groove to make the groove into the form of holes (recesses).

This increases the level of output sound pressure of the ultrasonic transducer and decreases the drive current. Particularly, the use of the ink jet method facilitates the banks of a minute height and the holes (recesses) to be formed on the projections.

It is preferable that the droplets be made of an electrically conductive material.

With such a structure, a conductive material is used as the droplet material to be applied to the projections of the fixed electrode (the lower electrode). In the case of using the conductive material, when the diaphragm is insulative, the diaphragm can be used as it is; when the diaphragm is noninsulative, it is necessary to form an insulating film on the surface of the diaphragm facing the fixed electrode (the lower electrode).

This allows a conductive droplet material to be used for forming the banks, thus extending the range of choices for the droplet material to form the banks on the projections.

Alternatively, the droplets can be made of an electrically nonconductive material.

With such a structure, a nonconductive material is used as the droplet material to be applied to the projections of the fixed electrode (the lower electrode). This allows a nonconductive droplet material to be used for forming the banks, thus extending the range of choices for the droplet material to form the banks on the projections.

According to a second aspect of the invention, there is provided a method of manufacturing an ultrasonic transducer including a diaphragm in which an electrode layer is formed on an insulator, and a fixed electrode having a plurality of asperities on the surface facing the diaphragm, wherein an alternating current signal is applied between the electrode layer formed on the diaphragm and the fixed electrode to generate ultrasonic waves, the method including forming the asperities having a plurality of projections and depressions on the surface of the fixed electrode facing the diaphragm, and forming a groove on the upper surfaces of the projections of the fixed electrode.

Thus, in the electrostatic ultrasonic transducer, the surface of the fixed electrode (the lower electrode) facing the diaphragm having an upper electrode is provided with an asperity structure and the surfaces of the projections of the fixed electrode (the lower electrode) is provided with a groove (a continuous groove or recesses).

This structure prevents the diaphragm from sticking to the fixed electrode (the lower electrode), thereby improving the efficiency of converting an electrical signal to a sound signal to increase the level of output sound pressure. Also the capacitance between the upper electrode and the fixed electrode (the lower electrode) can be reduced, thereby decreasing the drive current of the ultrasonic transducer.

It is preferable that the groove be formed by applying droplets onto the upper surfaces of the projections by an ink jet method to form banks.

Thus, a droplet material is applied onto the surfaces of the projections of the fixed electrode (the lower electrode) of the ultrasonic transducer by an ink jet method to form the banks of a minute height, thereby forming a groove (a continuous groove or recesses) on the surfaces of the projections.

Accordingly, the banks of a minute height and the groove can be formed extremely easily on the projections of the fixed electrode (the lower electrode). The ink jet method has high flexibility in the direction of application including rotation, so that the continuous groove or independent recesses can be easily formed on the circular projections. Since the groove or recesses of a minute depth generally need to be formed by etching, it requires an etching mask and etchant, posing the problem of an increase in cost and environmental problem of waste disposal. However, by the ink jet method, droplets can be applied only to the necessary portion, and so it is advantageous in cost and environmental considerations.

In one embodiment the groove formed by the banks is in the form of a continuous groove.

Thus, the banks of a minute height are arranged in parallel on the projections of the fixed electrode (the lower electrode) to form a continuous groove.

Accordingly, a groove can easily be formed on the projections of the fixed electrode (the lower electrode), thereby improving the characteristics of the ultrasonic transducer. Particularly, the use of the ink jet method facilitates the banks of a minute height to be formed on the projections.

It is preferable that the groove formed by the banks be in the form of independent recesses.

Thus, the banks of a minute height are first disposed in parallel on the projections of the fixed electrode (the lower electrode) to form a continuous groove, then banks serving as partitions are formed in the continuous groove to make the groove into the form of holes (recesses).

This increases the level of output sound pressure of the ultrasonic transducer and decreases the drive current. Particularly, the use of the ink jet method facilitates the banks of a minute height and the holes (recesses) to be formed on the projections.

The method of manufacturing an ultrasonic transducer according to an embodiment of the invention further includes a heating process after forming the banks by the ink jet method.

Thus, after the droplet material has been applied onto the projections of the fixed electrode (the lower electrode), the solvent is evaporated by the heating process.

This allows the droplet material to be firmly fixed to the projections in a short time.

The droplets can be made of an electrically conductive material.

Thus, a conductive material is used as the droplet material to be applied to the projections of the fixed electrode (the lower electrode). In the case of using the conductive material, when the diaphragm is insulative, the diaphragm can be used as it is; when the diaphragm is noninsulative, it is necessary to form an insulating film on the surface of the diaphragm facing the fixed electrode (the lower electrode).

This allows a conductive droplet material to be used for forming banks, thus extending the range of choices for the droplet material to form the banks on the projections.

Alternatively, the droplets may be made of an electrically nonconductive material.

Thus, a nonconductive material is used as the droplet material to be applied to the projections of the fixed electrode (the lower electrode). This allows a nonconductive droplet material to be used for forming banks, thus extending the range of choices for the droplet material to form the banks on the projections.

BRIEF DESCRIPTION OF THE DRAWINGS

The invention will be described with reference to the accompanying drawings, wherein like reference numbers refer to like elements, and wherein.

DETAILED DESCRIPTION

Preferred embodiments of the invention will be described hereinbelow with reference to the drawings.

Figure 1:
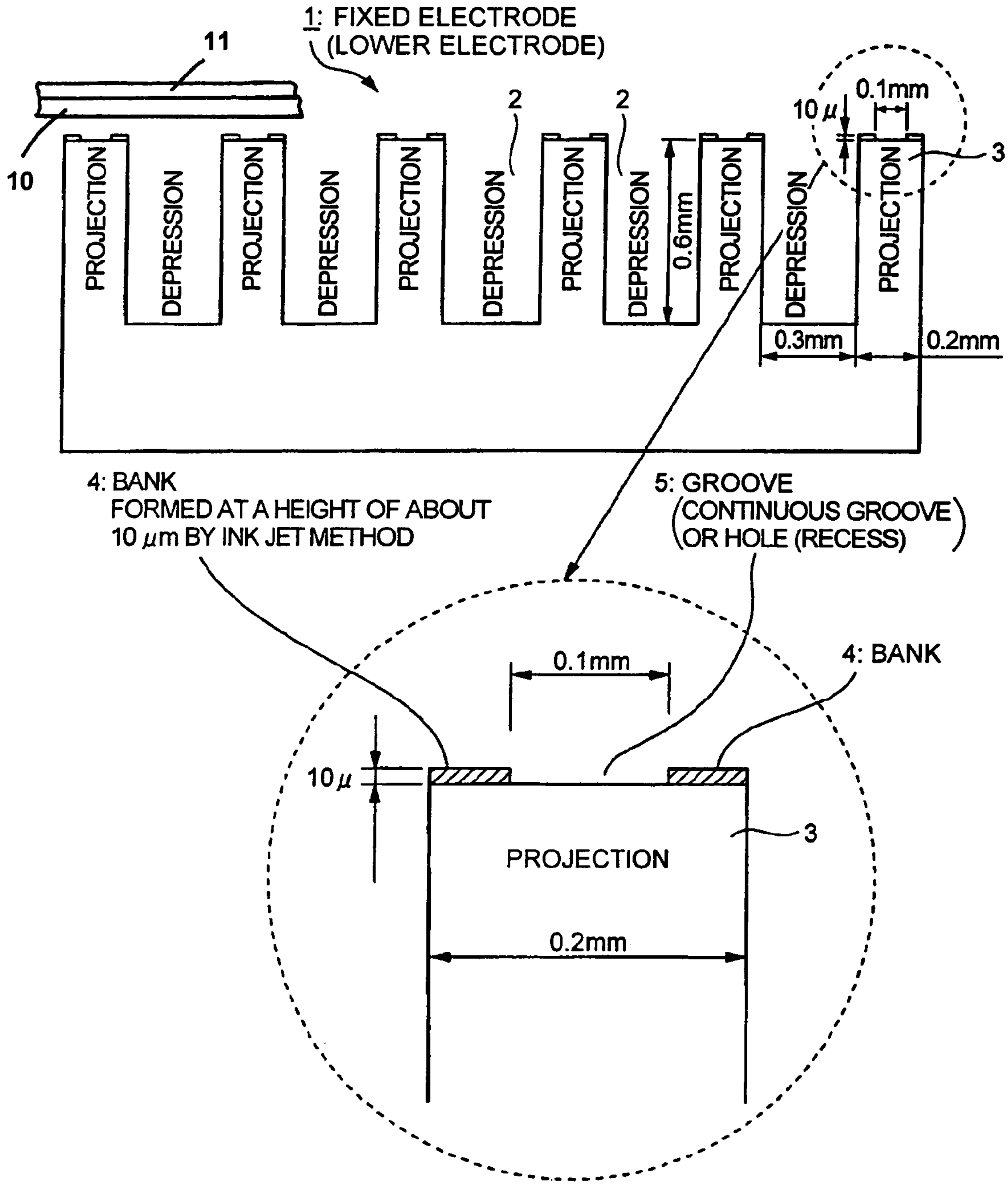
FIG. 1 is a sectional view of an example of a fixed electrode (a lower electrode) of an ultrasonic transducer according to an embodiment of the invention.

FIG. 1 is a sectional view of a fixed electrode (a lower electrode) 1 of an ultrasonic transducer according to an embodiment of the invention. Also shown in FIG. 1 is a diaphragm 10 and second electrode 11.

In FIG. 1, the fixed electrode 1 has valleys or depressions 2 and hills or projections 3. On the upper surfaces of the projections 3, ridges or banks 4 are formed by applying droplets (an epoxy-based droplet material or the like) by an ink jet method. A groove (a continuous groove or holes (recesses)) 5 is formed between the banks 4. The banks 4 and the groove 5 formed on the surface of each projection 3 prevent the diaphragm 10 from sticking to or being adsorbed by the fixed electrode (the lower electrode) 1, thereby improving the efficiency of converting an electrical signal to a sound signal to increase the level of output sound pressure for the transducer. The banks 4 and the groove 5 also reduce the capacitance between the upper electrode (not shown) and the fixed electrode 1, thereby decreasing the drive current of the ultrasonic transducer.

In the example of the fixed electrode 1 shown in FIG. 1, the depression 2 is 0.6 mm in depth and 0.3 mm in width. The projection 3 is 0.2 mm in width and 0.6 mm in height. The banks 4 on the upper surfaces of the projections 3 are arranged in parallel, with a spacing between each bank of 0.1 mm. Each bank is 50 μm in width and 10 μm in height, in this example.

The groove 5 between the banks 4 is 0.1 mm in width, which can be set in the range from 0.05 mm to 0.15 mm by varying the position of the banks 4. The height of the banks 4 can be set in the range from 5 μm to 20 μm.

The material of the fixed electrode 1 can be, for example, nickel, SUS, a copper-zinc alloy or brass, copper, and aluminum. When the fixed electrode 1 is made of aluminum, adherence with a droplet material can be improved by, for example, applying chrome plating onto the upper surfaces of the projections 3, or alternatively, by applying a liquid affinity treatment onto the upper surfaces of the projections 3.

Figure 2:
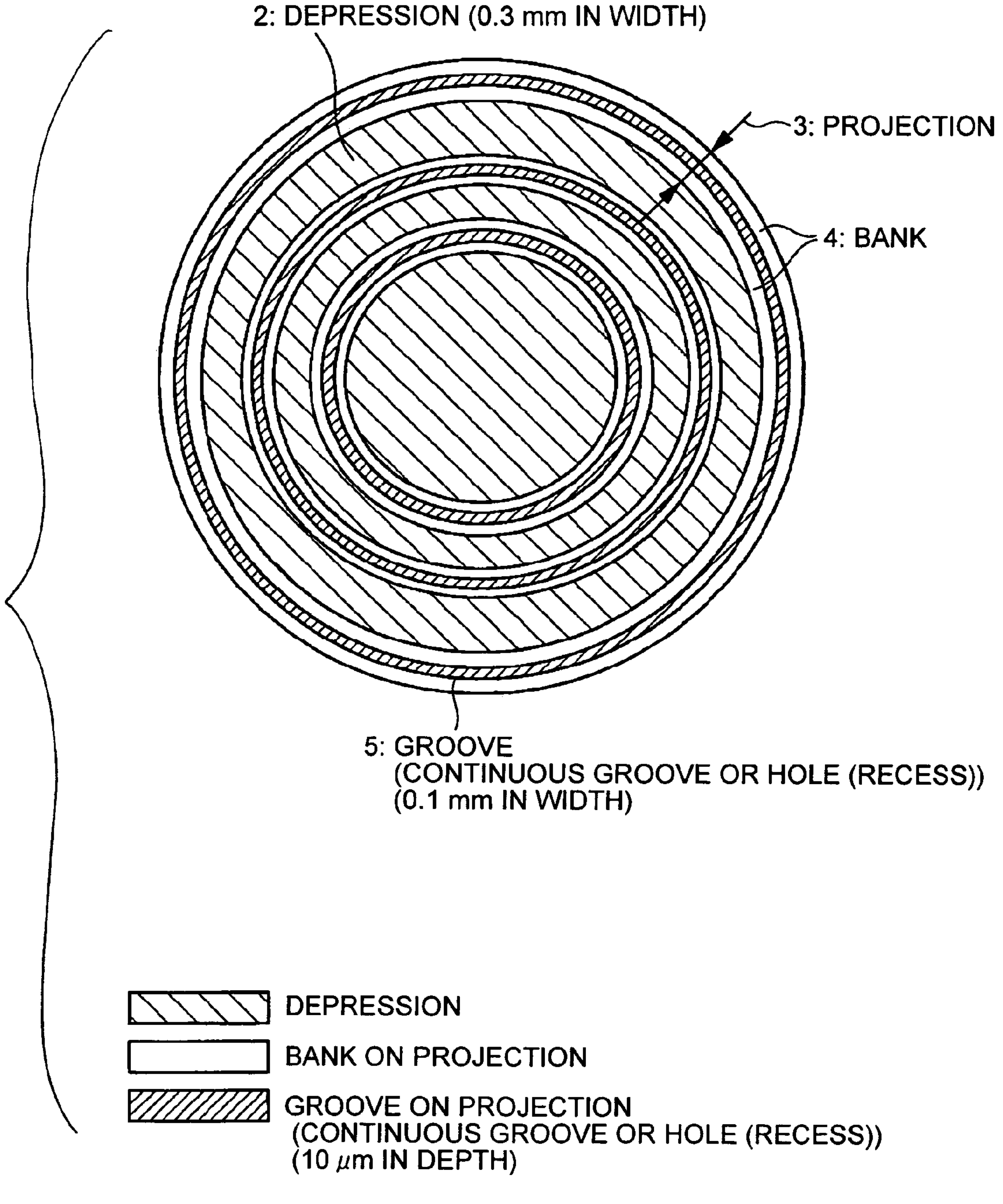
FIG. 2 is a plan view of the fixed electrode.

FIG. 2 is a schematic plan view of the fixed electrode 1, in which the banks 4 are formed on the upper surfaces of the projections 3. In the example of FIG. 2, the banks 4 are formed on the projections 3 in parallel at intervals of 0.1 mm to form the groove 5. The groove 5 can be a continuous groove or it may take the form of holes or recesses defined by crossing banks which form partitions as will be described in later examples. Although there are three projections 3 in the example of FIG. 2, there may be more than three projections 3 if required.

Figure 3A:
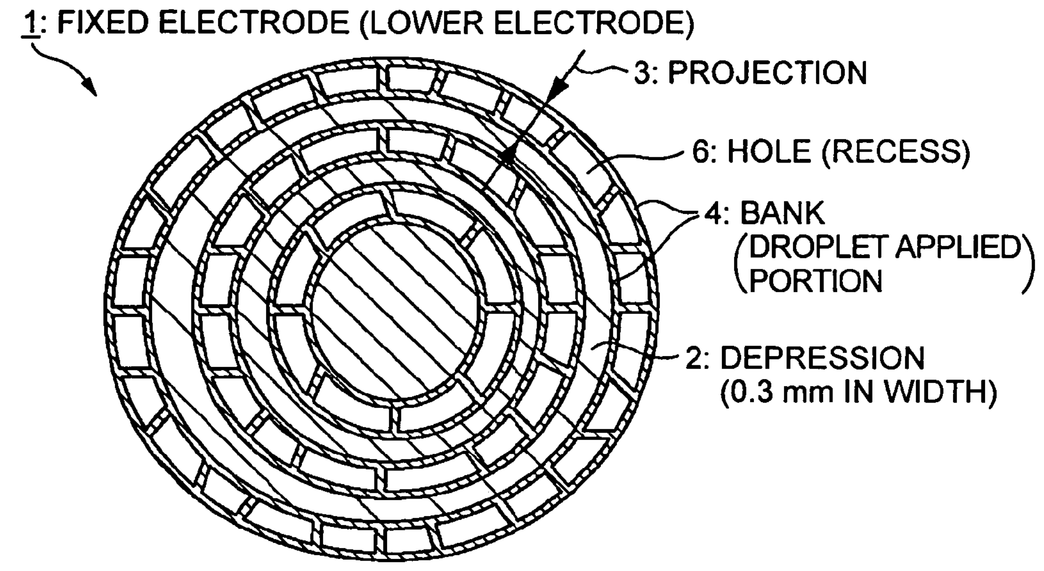
FIG. 3A is a plan view of a circular fixed electrode having a hole (recess)-like groove on a projection.
Figure 3B:
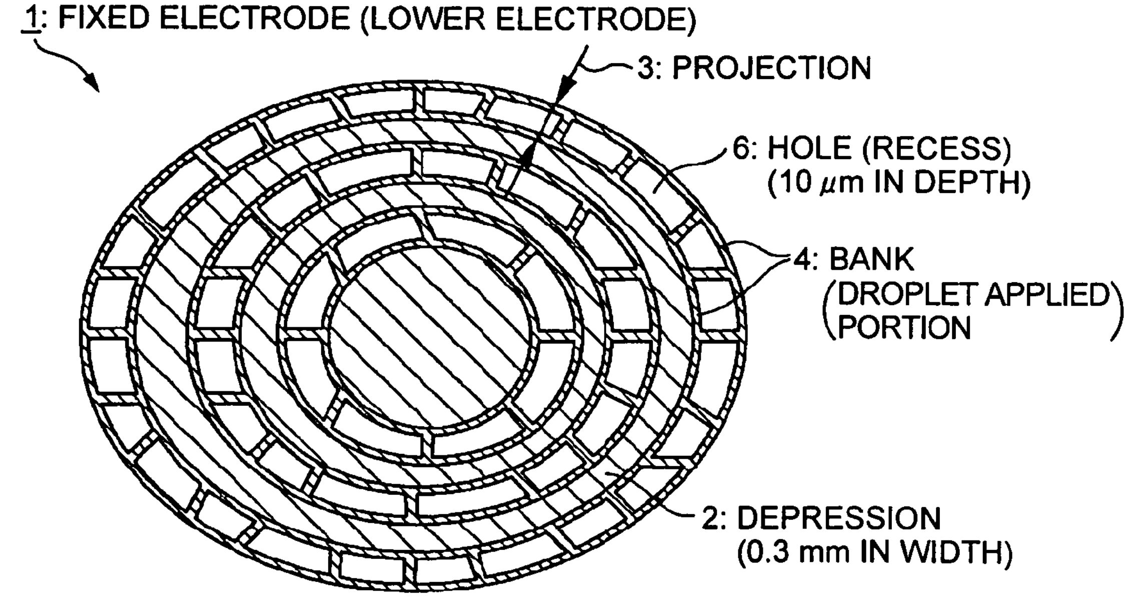
FIG. 3B is a plan view of an elliptical fixed electrode having a hole (recess)-like groove on the projection.

FIGS. 3A and 3B are plan views of the fixed electrode 1 having a partitioned groove on the projection 3, in which the banks 4 and holes (recesses) 6 are shown on an enlarged scale for the sake of easy understanding. FIG. 3A shows an example of a circular fixed electrode (lower electrode) and FIG. 3B shows an example of an elliptical fixed electrode (lower electrode). As shown in FIGS. 3A and 3B, a droplet material is applied onto the surfaces of the projections 3 by the ink jet method such that the banks 4 form the holes (recesses) 6. For the droplet material, an adhesive epoxy-based material is used when insulating banks need to be formed.

Figure 4A:
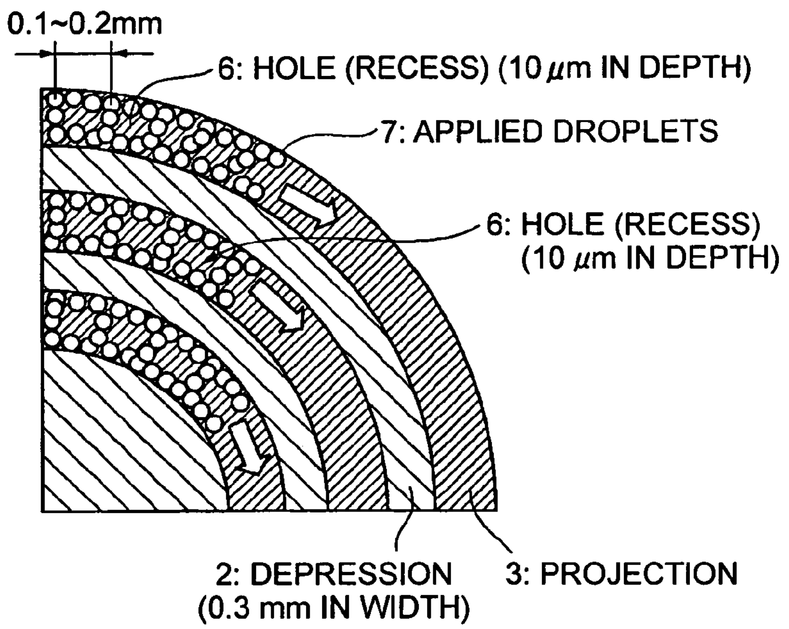
FIGS. 4A to 4D are diagrams in which examples of application of droplets by an ink jet method are shown.

FIGS. 4A to 4D are diagrams in which examples of application of droplets by the ink jet method are shown. FIG. 4A shows an example in which the banks 4 are formed so as to form the holes (recesses) 6 on the projections 3. As shown in FIG. 4A, droplets 7 are emitted continuously onto the upper surfaces of the projections 3 by the ink jet method to form continuous banks of a minute height. Droplets are also applied across the continuous banks in a radially inwardly direction to form partitions that define holes or recesses 6 about 10 μm deep. The partitions are provided at intervals of 0.1 mm to 0.2 mm.

After the banks 4 have been formed by applying the droplets 7, a burning or heating process is executed to solidify the applied droplet material by evaporating the solvent. For example, the burning process is executed at temperatures from 100° C. to 200° C. Thus, after the droplet material has been applied onto the projections 3 of the fixed electrode (the lower electrode) 1, the solvent is evaporated by the burning process, allowing the droplet material to be firmly fixed to the projections 3 in a short time.

The droplet material to be applied to the projections 3 may be either a conductive material or a nonconductive material. In the case of using the conductive material, when the diaphragm is insulative, the diaphragm can be used as it is; when the diaphragm is noninsulative, it is necessary to form an insulating film on the surface of the diaphragm facing the fixed electrode (lower electrode) 1.

Figure 4B:
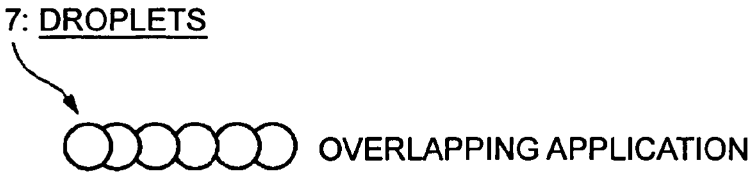
Figure 4C:
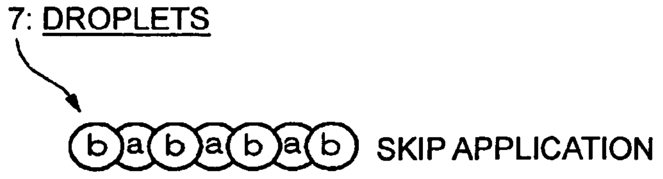
Figure 4D:
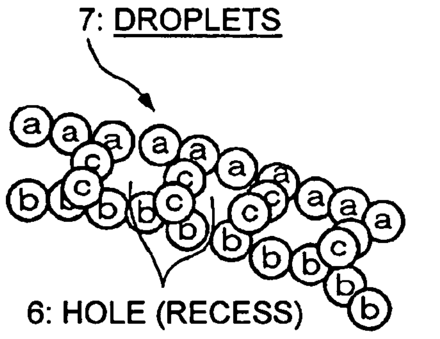

There are several methods for applying the droplets 7. For example, FIG. 4B shows an application method in which the droplets 7 are applied in such a manner so as to overlap with each other. FIG. 4C shows a skip method in which after droplets "a" are applied at intervals and then droplets "b" are applied. FIG. 4D shows a droplet application method whereby the holes (recesses) 6 are formed, in which the droplets "a" are first applied to form one bank, then the droplets "b" are applied to form the other bank, and finally, droplets "c" are applied to form the partitions defining the holes (recesses) 6.

Figure 5:
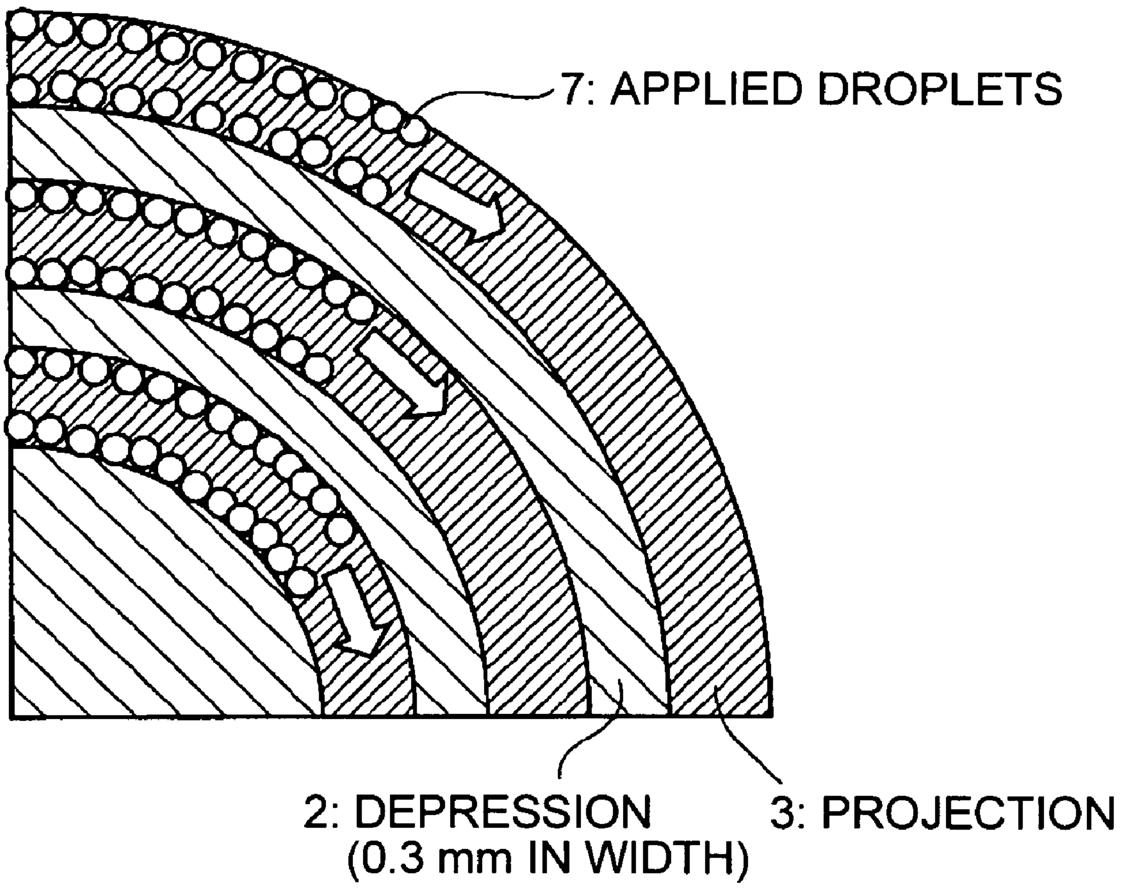
FIG. 5 is a diagram showing an example of application of droplets such that a continuous groove is formed on the projection.

FIG. 5 is a diagram showing an example of application of the droplets 7 such that a continuous groove is formed on the projection 3 without forming the holes (recesses) 6.

Figure 6A:
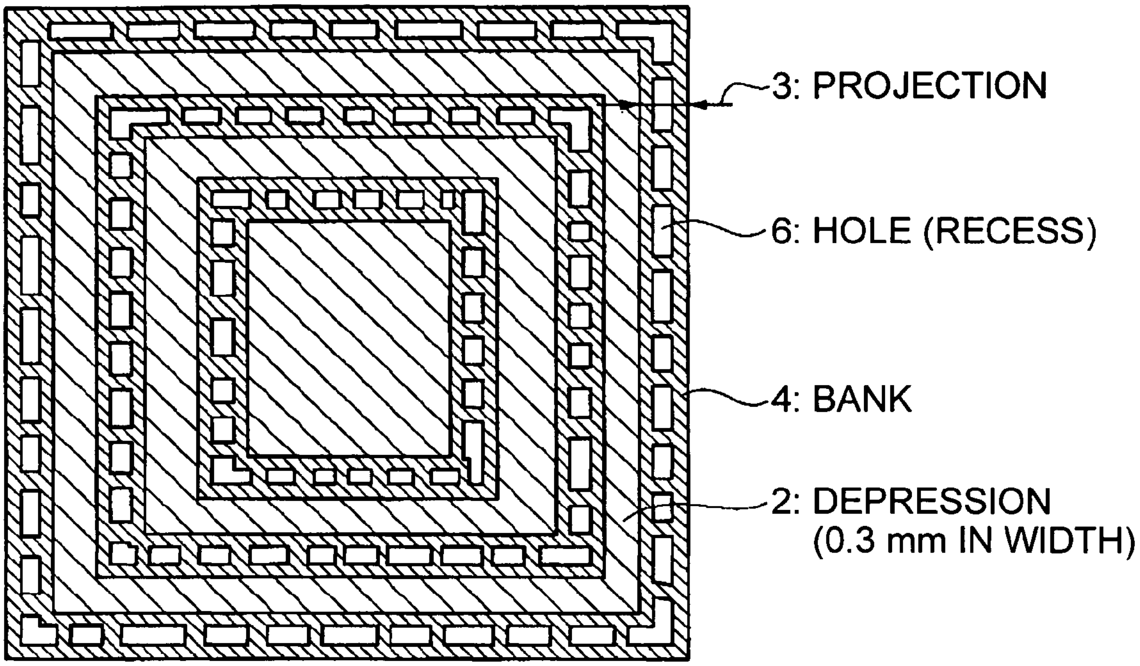
FIG. 6A is a plan view of another structural example of the fixed electrode.
Figure 6B:
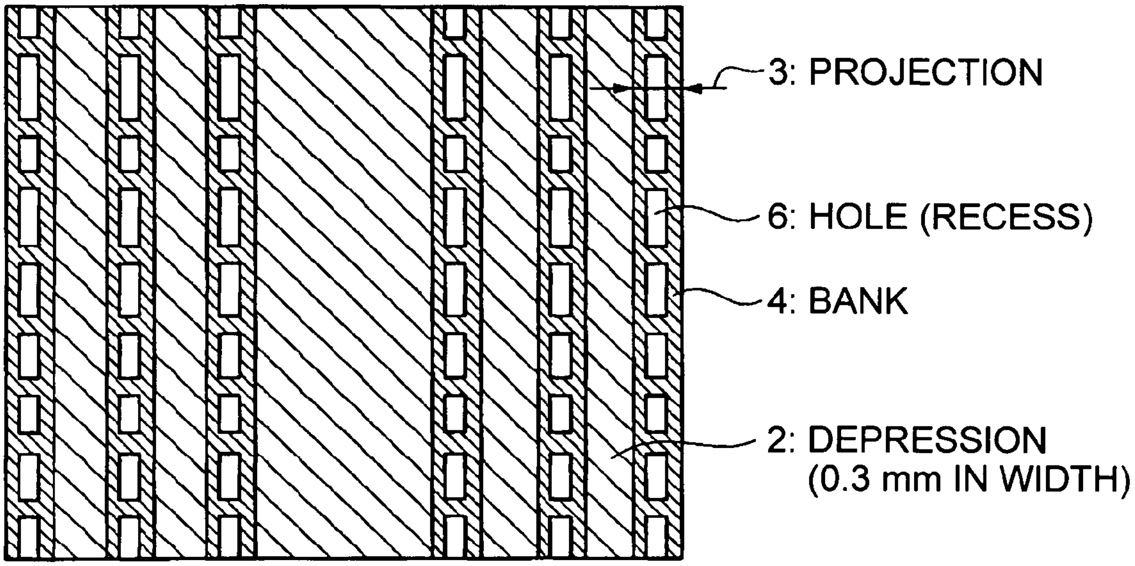
FIG. 6B is a plan view of still another structural example of the fixed electrode.

FIGS. 6A and 6B are plan views of other structural examples of the fixed electrode. FIG. 6A shows an example in which the banks 4 and the holes (recesses) 6 are formed on rectangular projections 3, and FIG. 6B shows an example in which the projections 3 are arranged linearly, on which the banks 4 and the holes (recesses) 6 are formed. Thus, the fixed electrode (lower electrode) 1 and the projections 3 may have any shape. The projections 3 may have a continuous groove without the holes (recesses) 6.

Figure 7:
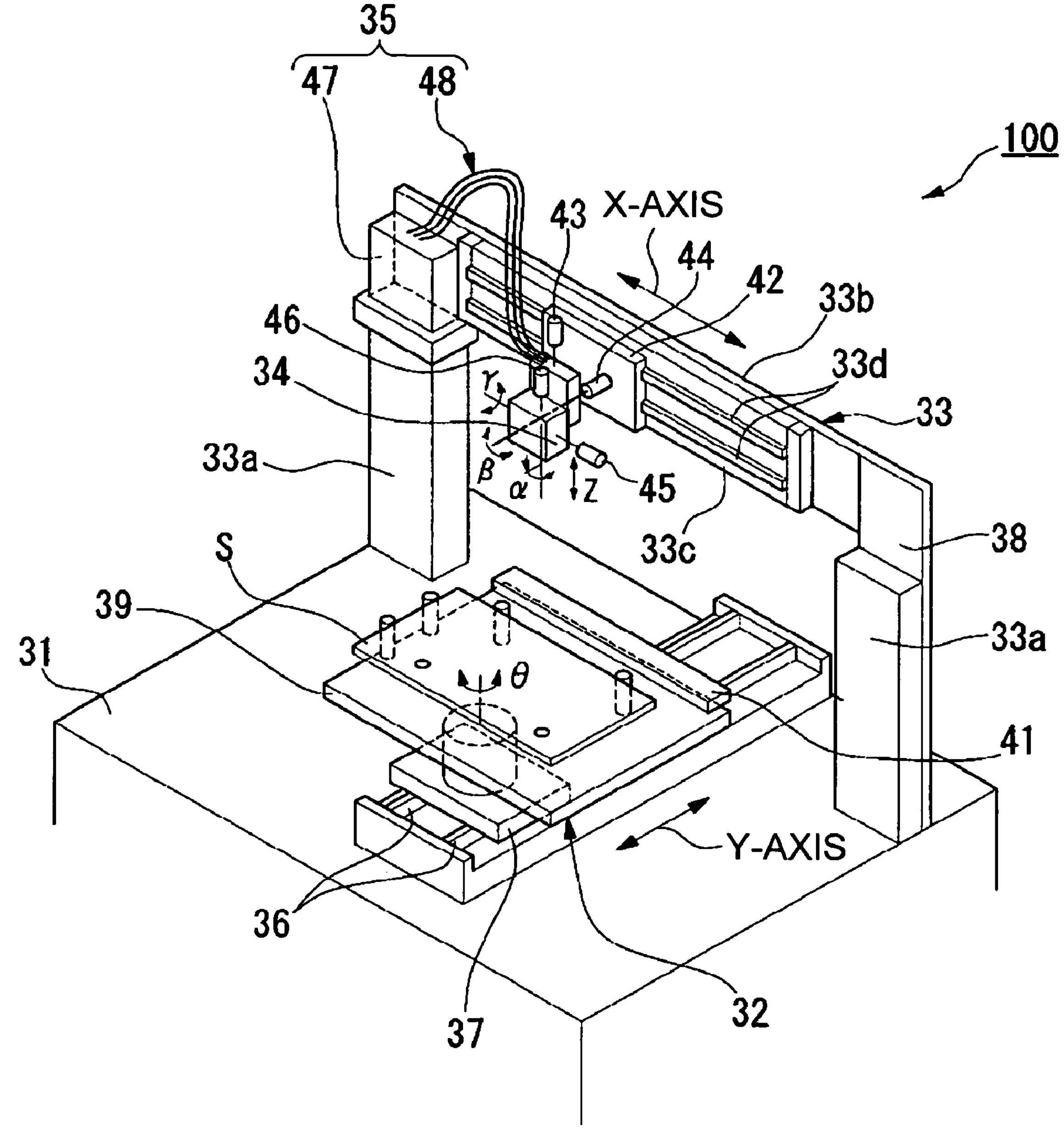
FIG. 7 is a schematic perspective view of a droplet ejector.

FIG. 7 is a schematic perspective view of a droplet ejector 100 (hereinafter, also referred to as an ink jet unit 100). The ink jet unit 100 includes a base 31, a board moving unit 32, a head moving unit 33, an ink jet head (head) 34, an ink (liquid) supply unit 35, and so on. The base 31 has the board moving unit 32 and the head moving unit 33 thereon.

The board moving unit 32 is provided on the base 31 and has guide rails 36 along the Y-axis (in the main scanning direction). The board moving unit 32 moves a slider 37 along the guide rails 36 by, for example, a linear motor. The slider 37 has a θ-axis motor (not shown). The motor is, for example, a direct drive motor, whose rotor (not shown) is fixed to a table 39. With such a structure, when the motor is energized, the rotor and the table 39 are rotated in the direction θ, so that the table 39 is rotated a specified angle θ with respect to the Y-axis and is fixed there.

The table 39 is used to position a board S (corresponding to the fixed electrode 1 to be processed) and hold it. Specifically, the table 39 has a known adsorbing unit (not shown) and holds the board S on the table 39 by adsorption of the adsorbing unit. The board S is positioned properly and held in a specified position on the table 39 with a positioning pin (not shown) of the table 39. The table 39 has a waste-ejection area 41 to which the ink jet head 34 emits ink (a liquid compound) by way of trial. The waste-ejection area 41 is provided along the X-axis (in the subscanning direction) and at the rear end of the table 39.

The head moving unit 33 includes a pair of stands 33*a* provided at the rear of the base 31 and a running path 33*b* provided on the stands 33*a*. The running path 33*b* is arranged in the X-axis (in the subscanning direction), or in the direction perpendicular to the Y-axis (the main scanning direction) of the board moving unit 32. The running path 33*b* includes a retaining plate 33*c* built between the stands 33*a* and a pair of guide rails 33*d* provided on the retaining plate 33*c*, and movably holds a slider 42 that retains the ink jet head 34 along the length of the guide rails 33*d*. The slider 42 runs on the guide rails 33*d* by the operation of a linear motor (not shown) or the like to move the ink jet head 34 in the direction of X-axis.

To the ink jet head 34, motors 43, 44, 45, and 46 serving as movement positioning means are connected. When the motor 43 connected to the slider 42 and the ink jet head 34 is started, the ink jet head 34 moves vertically along the Z-axis, and so is positioned on the Z-axis. The Z-axis is orthogonal to the X-axis and the Y-axis (in the vertical direction). When the motor 44 is started, the ink jet head 34 moves in the β-direction in FIG. 7; when the motor 45 is started, the ink jet head 34 moves in the γ-direction; and when the motor 46 is started, the ink jet head 34 moves in the α-direction. Thus, the ink jet head 34 is positioned.

Thus, the ink jet head 34 moves linearly along the Z-axis on the slider 42 and also moves along the α-, β-, and γ-axes, thereby being positioned. Thus, the position of the ink-emitting surface of the ink jet head 34 with respect to the board S (the fixed electrode 1 to be processed) on the table 39 can be controlled properly.

Figure 8A:
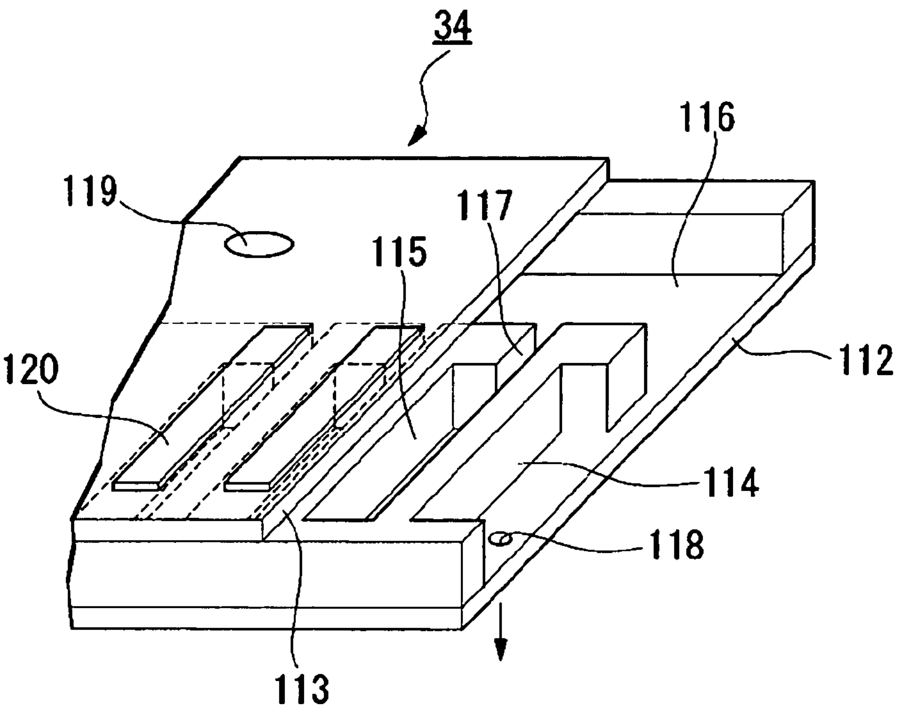
FIG. 8A is a perspective view of an ink jet head.

As shown in FIG. 8A, the ink jet head 34 includes a nozzle plate 112 made of stainless steel or the like and a vibrating plate 113, both of which are bonded together via a partition (reservoir plate) 114. Between the nozzle plate 112 and the vibrating plate 113, a plurality of spaces 115 and a reservoir 116 are formed by the partition 114. The interior of the spaces 115 and the reservoir 116 are filled with ink (the compound of the projections) and communicate with each other through supply ports 117. The nozzle plate 112 has a plurality of nozzle holes 118 in a row, for emitting a jet of ink (the compound of the projections) from the spaces 115. The vibrating plate 113 has a hole 119 for supplying the ink (the compound of the projections) into the reservoir 116.

Figure 8B:
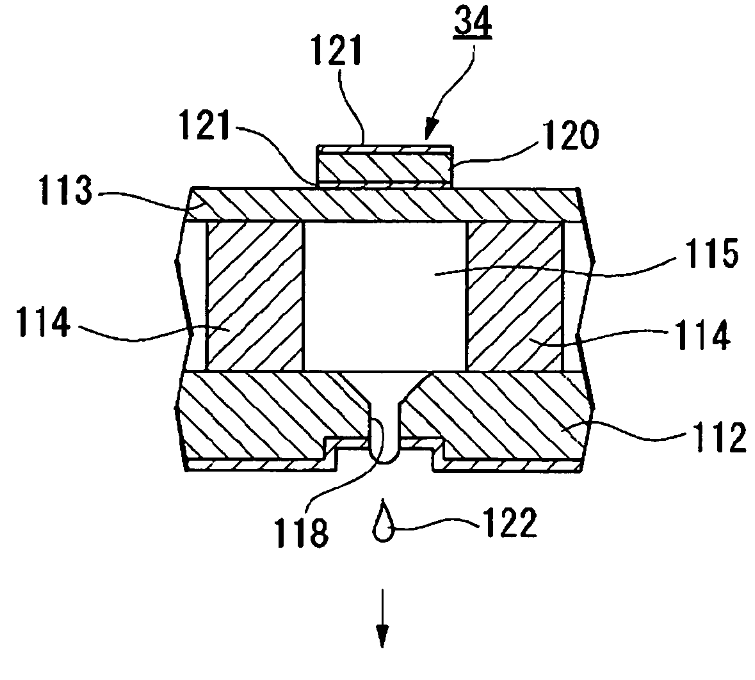
FIG. 8B is a side view of the ink jet head.

Referring to FIG. 8B, a piezoelectric element 120 is joined to the surface of the vibrating plate 113 opposite to the surface facing the spaces 115. The piezoelectric element 120 is located between a pair of electrodes 121 and, when energized, it is bent to project outward. The vibrating plate 113, to which the piezoelectric element 120 is joined with such a structure, is bent outward together with the piezoelectric element 120 at the same time, thus increasing the capacity of the spaces 115. Accordingly, ink (the compound of the projections) corresponding to the increased capacity flows from the reservoir 116 into the spaces 115 through the supply ports 117. When the energization to the piezoelectric element 120 is cut off from this state, the piezoelectric element 120 and the vibrating plate 113 return to the original shape. Accordingly, also the spaces 115 resumes the original capacity, increasing the pressure of the ink (the compound of the projections) in the spaces 115, so that ink droplets 122 are emitted from the nozzle holes 118 toward the board S. The ink jet method of the ink jet head 34 may be other than the piezo-jet type using the piezoelectric element 120, such as a bubble-jet (registered trademark) method.

Referring back to FIG. 7, the ink supply unit 35 includes a ink source 47 for supplying ink (the compound of the projections) to the ink jet head 34 and an ink supply tube 48 for feeding the ink (the compound of the projections) from the ink source 47 to the ink jet head 34. In other words, the system adopts the method of storing ink (the compound of the projections) in the ink source 47, or a stainless container, temporarily, and feeding the ink to the ink jet head 34 through the ink supply tube 48.

As has been described, a groove or holes (recesses) are formed in the projections of the fixed electrode with the ink jet unit 100, so that banks of a minute height can be formed on the fixed electrode (lower electrode) extremely easily. The ink jet method has high flexibility in the direction of application including rotation, so that the continuous groove or independent recesses can be easily formed on the circular projection, as in the embodiment of the invention.

Since a droplet material can be applied in sequence onto a plurality of works (fixed electrodes) placed on the stage, the invention offers high productivity. Furthermore, since there is no need to prepare the spacer of complex shape as in the prior art, the invention costs low. Also, the larger the electrostatic ultrasonic transducer is, the higher the degrees of making good use of the material and the flexibility of machinability are, increasing the advantage of the invention.

Figure 9A:
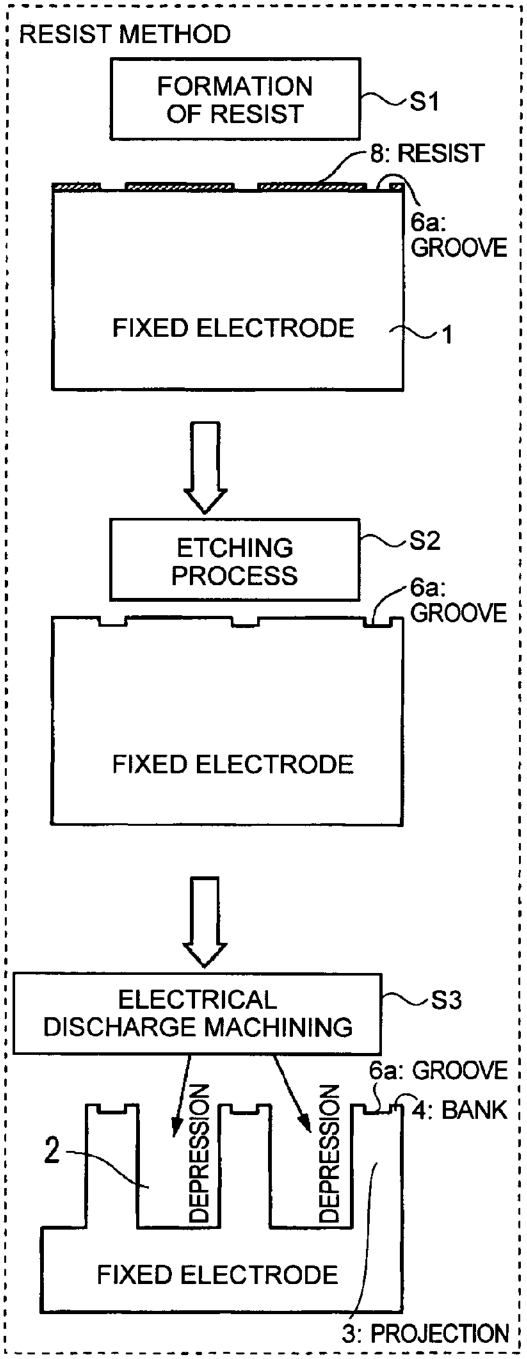
FIG. 9A is a diagram in which another method of forming banks is shown.
Figure 9B:
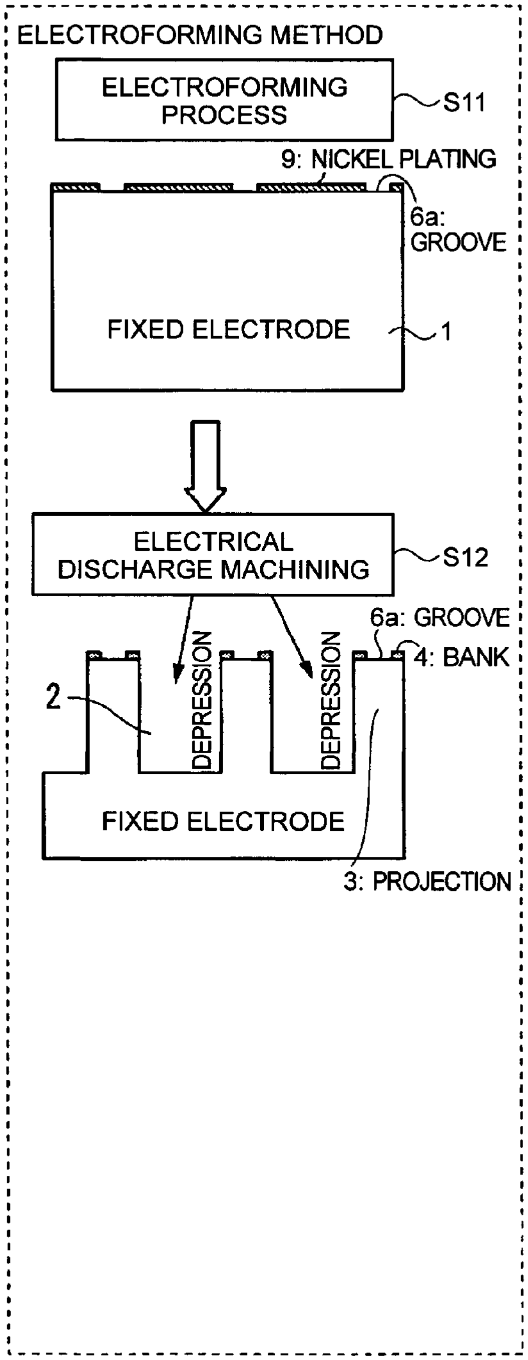
FIG. 9B is a diagram in which still another method of forming banks is shown.
Figure 10:
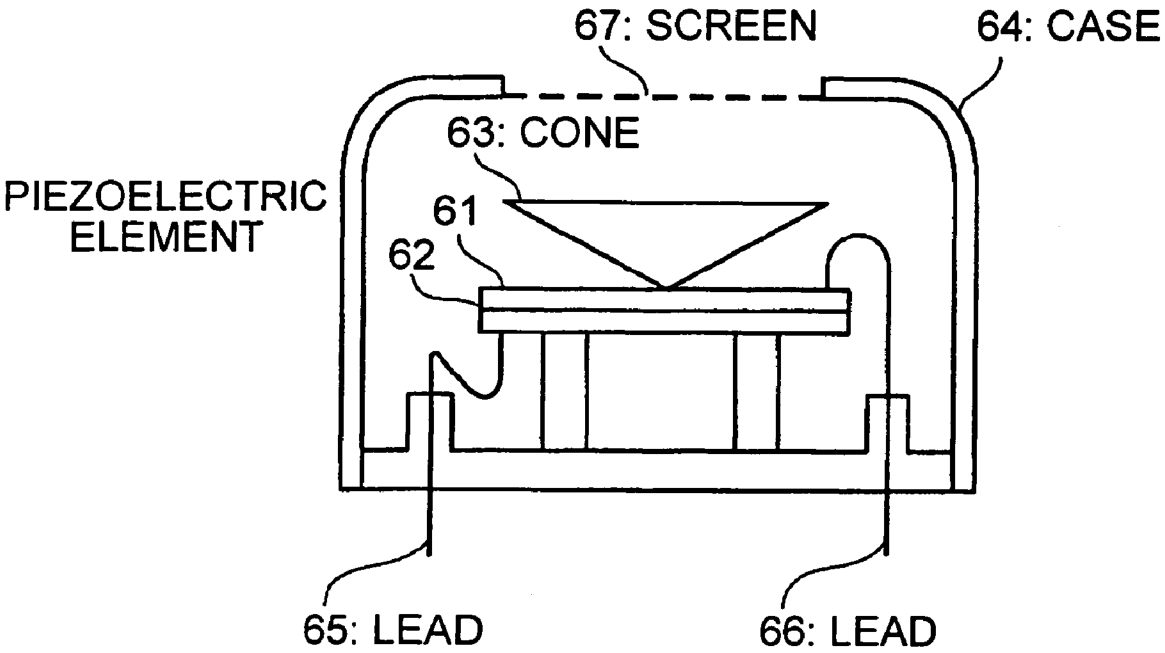
FIG. 10 PRIOR ART
FIG. 10 is a diagram in which a prior art resonant ultrasonic transducer is shown.
Figure 11A:
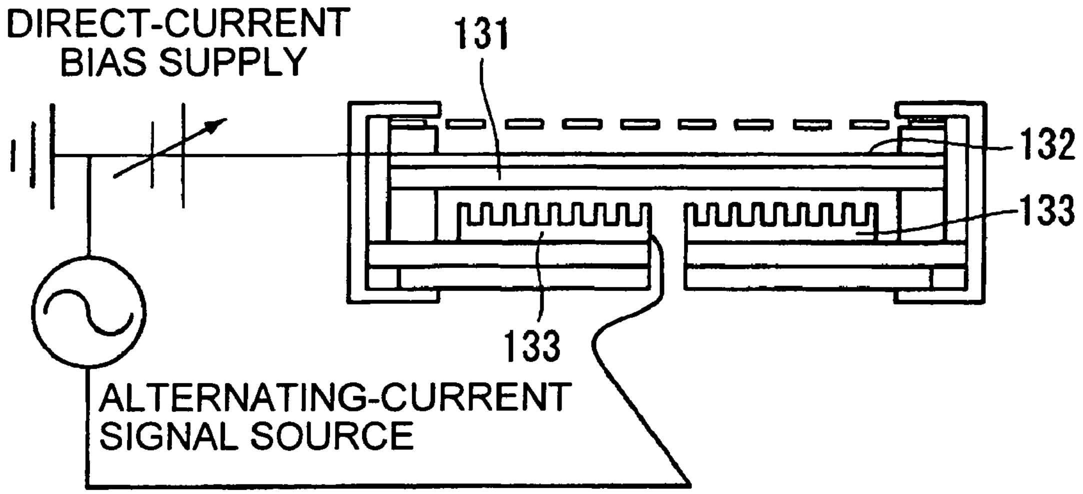
FIG. 11A PRIOR ART
FIG. 11A is a diagram in which a prior art electrostatic ultrasonic transducer is shown.
Figure 11B:
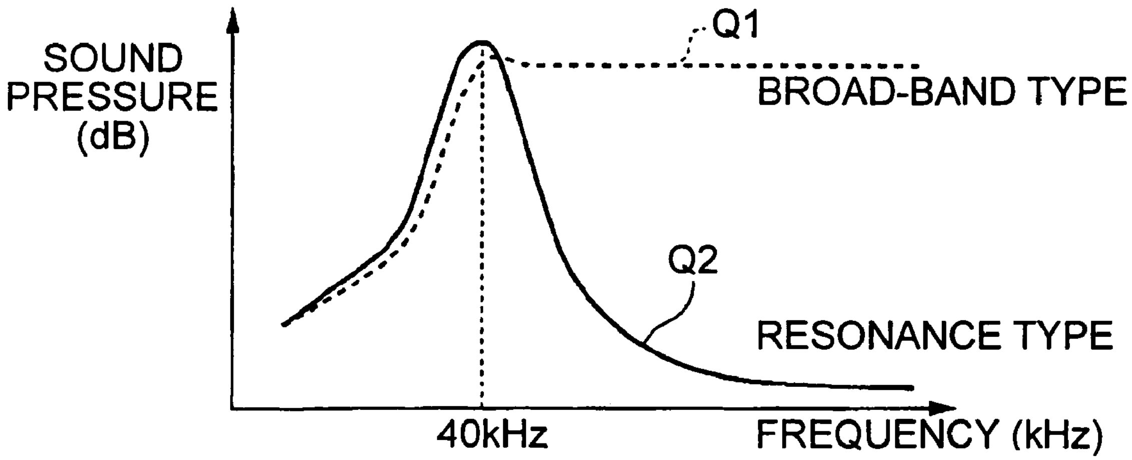
FIG. 11B PRIOR ART
FIG. 11B is a graph of the frequency response of the prior art electrostatic ultrasonic transducer.

FIGS. 9A and 9B are diagrams in which other methods of forming the banks are shown. FIG. 9A shows a method of forming banks by etching, and FIG. 9B shows a method of forming banks by electroforming.

In the case of forming the banks by etching, shown in FIG. 9A, a resist 8 is first formed on the surface of each projection 3 to form a groove 6*a* (step S1). The upper surface of the fixed electrode 1 is subjected to etching with the resist 8 and etchant to form the groove 6*a* on the projection 3 (step S2). Then the depressions 2 are formed by electrical discharge machining (step S3). In the electroforming method shown in FIG. 9B, the fixed electrode 1 is first subjected to nickel plating 9 by electroforming to form portions to be the banks 4 and the groove 6*a* (step S11). Then the depressions 2 are formed by electrical discharge machining (step S12).

Since the conventional etching method requires to form the groove or recesses of a minute depth by etching, it needs an etching mask and etchant, posing the problem of an increase in cost and environmental problem of waste disposal. However, by the ink jet method according to the invention, only requirement can be applied only to a necessary portion, and so it is advantageous in cost and environment. The method by electroforming requires more expenses and labor than the ink jet method of the invention.

As described above, the method of forming banks by the ink jet method of the invention is becoming more useful with an increase in the size of the electrostatic ultrasonic transducer as a high-decibel output speaker.

While the invention has been described with reference to preferred embodiments, it is to be understood that the ultrasonic transducer and the method of manufacturing the ultrasonic transducer of the invention are not limited to the foregoing embodiments, and that various modifications can be made without departing from the sprit and scope of the invention.

What is claimed is:

1. An ultrasonic transducer comprising:

a diaphragm having a first electrode thereon; and a fixed electrode having a plurality of asperities, said asperities having projections with upper surfaces facing the diaphragm, said upper surfaces having at least one groove formed therein, wherein an alternating current signal applied between the first electrode and the fixed electrode generates ultrasonic waves, with the groove in the projections preventing the diaphragm from sticking to the projections.

2. The ultrasonic transducer according to claim 1, wherein the groove is formed by applying droplets onto the upper surface of the projections by an ink jet method to form banks.

3. The ultrasonic transducer according to claim 2, wherein the groove formed by the banks is in the form of a continuous groove.

4. The ultrasonic transducer according to claim 2, wherein the groove formed by the banks is in the form of partitioned recesses.

5. The ultrasonic transducer according to claim 2, wherein the droplets are made of an electrically conductive material.

6. The ultrasonic transducer according to claim 2, wherein the droplets are made of an electrically nonconductive material.

* * * * *